US009438051B2

(12) United States Patent
Firman, II et al.

(10) Patent No.: US 9,438,051 B2
(45) Date of Patent: Sep. 6, 2016

(54) USB POWER OUTLET/CHARGER DIRECT REPLACEMENT FOR AUTOMOTIVE CIGAR LIGHTER/POWER OUTLET

(71) Applicants: Gary Lee Firman, II, Oakland, MI (US); Thomas Chrapkiewicz, Oakland, MI (US); Richard P. Cuplin, Wayne, MI (US)

(72) Inventors: Gary Lee Firman, II, Oakland, MI (US); Thomas Chrapkiewicz, Oakland, MI (US); Richard P. Cuplin, Wayne, MI (US)

(73) Assignee: CASCO PRODUCTS CORPORATION, Bridgeport, CT (US)

( * ) Notice: Subject to any disclaimer, the term of this patent is extended or adjusted under 35 U.S.C. 154(b) by 707 days.

(21) Appl. No.: 13/886,475

(22) Filed: May 3, 2013

(65) Prior Publication Data

US 2014/0328076 A1    Nov. 6, 2014

(51) Int. Cl.
| | | |
|---|---|---|
| *H02J 7/00* | (2006.01) | |
| *B60Q 3/00* | (2006.01) | |
| *B60Q 3/02* | (2006.01) | |
| *H01R 31/06* | (2006.01) | |
| *H01R 13/447* | (2006.01) | |

(Continued)

(52) U.S. Cl.
CPC ............. *H02J 7/0042* (2013.01); *B60Q 3/002* (2013.01); *B60Q 3/0236* (2013.01); *H01R 13/6675* (2013.01); *H01R 31/065* (2013.01); *H01R 13/447* (2013.01); *H01R 13/64* (2013.01); *H01R 13/665* (2013.01); *H01R 13/717* (2013.01); *H01R 13/743* (2013.01)

(58) Field of Classification Search
CPC ......... B60R 1/025; B60R 1/08; B60Q 3/007; H02J 7/0042
See application file for complete search history.

(56) References Cited

U.S. PATENT DOCUMENTS 4,079,242 A * 3/1978 Seibel ...................... B60N 3/14
                                                    362/311.06
5,822,427 A   10/1998 Braitberg et al.

(Continued)

FOREIGN PATENT DOCUMENTS

DE        19756701        7/1998

OTHER PUBLICATIONS

International Preliminary Report on Patentability dated Nov. 12, 2015 issued in related PCT International Application No. PCT/US14/017380.

(Continued)

*Primary Examiner* — Kenneth B Wells
*Assistant Examiner* — Rafael Pacheco
(74) *Attorney, Agent, or Firm* — Ostrolenk Faber LLP

(57) ABSTRACT

A power outlet/charger for a portable electronic device, the power outlet/charger comprising an electrically insulating housing having a proximal end having an opening and a distal end having a first electrical connector; an electronic converter circuit fixedly housed in the housing for receiving a first voltage from a vehicle electrical power source through the first connector and for converting the first voltage to a second voltage compatible with the USB (Universal Serial Bus) standard; and a USB connector disposed through the proximal end opening and connected to receive the second voltage; the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector. Preferably, the first connector comprises a US-CAR connector.

24 Claims, 13 Drawing Sheets

(51) Int. Cl.
    *H01R 13/64*     (2006.01)
    *H01R 13/66*     (2006.01)
    *H01R 13/717*    (2006.01)
    *H01R 13/74*     (2006.01)

(56) References Cited

U.S. PATENT DOCUMENTS

| | | |
|---|---|---|
| 6,140,934 A | 10/2000 | Lam |
| 7,427,216 B1* | 9/2008 | Wu ............... H01R 13/2421 |
| | | 439/638 |
| 7,438,602 B2 | 10/2008 | Montgomery et al. |
| 7,701,080 B2 | 4/2010 | Belanger, Jr. et al. |
| 7,987,487 B2 | 7/2011 | Rackin et al. |
| 8,446,125 B2* | 5/2013 | Mkhitarian ........... H02J 7/0045 |
| | | 320/105 |
| 9,039,455 B2* | 5/2015 | Hsieh ............... H01R 31/065 |
| | | 439/638 |
| 2004/0053525 A1 | 3/2004 | Matsuo |
| 2004/0092156 A1 | 5/2004 | Arkin |
| 2007/0081334 A1* | 4/2007 | Baldauf ............... B60N 3/14 |
| | | 362/253 |
| 2008/0311791 A1 | 12/2008 | Neale |
| 2009/0033149 A1 | 2/2009 | Patel |
| 2010/0321939 A1 | 12/2010 | Patel |
| 2011/0084660 A1 | 4/2011 | McSweyn |
| 2011/0223806 A1 | 9/2011 | You |

OTHER PUBLICATIONS

International Search Report and Written Opinion dated May 9, 2014 in corresponding International Application No. PCT/US2014/017380.

* cited by examiner

USB POWER OUTLET/CHARGER DIRECT REPLACEMENT FOR AUTOMOTIVE CIGAR LIGHTER/POWER OUTLET

BACKGROUND OF THE INVENTION

The present invention relates to power outlet/battery chargers for portable electronic/electrical devices, and in particular, to a USB (Universal Serial Bus) power socket/charger that can directly replace a cigar lighter/power outlet socket commonly found in automotive vehicles. In particular, the invention relates to a power outlet/charger that can be used as a direct replacement for an automotive cigar lighter/power outlet and having a USB jack for receiving a USB connector plug at an output end and having a US-CAR (United States Counsel for Automotive Research) connector at an input end. US-CAR connectors are commonly found on the wiring harnesses of currently made United States production vehicles for connecting the vehicle wiring harness to a power outlet/cigar lighter socket.

Presently, automobiles manufactured in the U.S. are commonly provided with either a cigar lighter or power outlet or both types of sockets. The cigar lighter socket can receive a cigar lighter which is heated in the socket to an ignition temperature and has an automatic disconnect device, typically a bimetal device, either found in the socket or in the cigar lighter plugged into the socket.

Power outlets having similar proportions are commonly found in vehicles. These power outlets are adapted to receive the accessory plugs of portable electrical/electronic devices and/or charging devices. The cigar lighter socket, in addition to being able to receive a cigar lighter, can also receive the same electrical accessory plug received by the power outlet.

Such plugs typically have a spring loaded center contact for connecting to a center positive side supply contact of the socket of the power outlet/cigar lighter receptacle, and one or more spring mounted side contacts which engage with the socket wall and which functions as the ground return. An example of the type of accessory plug is shown at 100 on FIG. 22, where the positive supply contact is indicated at 102 and the ground return contact at 104. FIG. 23 shows an example of the power outlet 110 into which plug 100 is inserted, showing the socket well 106 and connector part 108 for connecting to the vehicle wiring harness.

Many of today's portable electronic devices are provided with a USB connection. The USB connection can function to enable serial data transfer between devices connected by the USB cable. In addition, the USB connection includes a voltage source connection to the connected device that can be used to charge the battery of the portable device. The USB voltage is typically 5 volts.

The cigar lighter/power outlet sockets can be used to charge the batteries of portable electronic devices. However, in order to utilize the power outlets/cigar lighter outlets of automotive vehicles to charge a device that conforms to the USB standard, it is necessary to provide a converter that will convert the 12-14 volt supply voltage from an automotive vehicle to the 5 volt USB standard. Furthermore, it is necessary that such a converter have an adaptor plug that can plug into the automotive cigar lighter/power outlet style socket, provide power to the converter through a suitable electrical connector arrangement and provide a male USB type connector for plugging into the portable electrical/electronic device being recharged.

This presents the need for separate converter/charging devices and the accompanying need to store them in the vehicle or carry them as needed when it is necessary to power or charge the portable electronic/electrical device.

At the same time, there is less need for the older style cigar lighter/power outlet sockets that have been typically employed in the past because so many devices now conform to the USB connector standard.

There is a need therefore, for a permanently fixed power outlet/charging device that can be employed in vehicles to provide a 5 volt supply through a USB connector for powering and/or charging electrical devices through a USB connector plug.

There is furthermore a need for such a USB style power outlet/charger that can provide a direct replacement for the standard 12 volt cigar lighter/power outlet socket now employed in vehicles that provides a 5 volt supply conforming to the USB standard.

Furthermore, there is a need for such a power outlet/charger that can provide up to 2.1 Amperes at 5 volts through a USB style connector for USB 2.0 smart charging for a variety of mobile/portable devices such as cell phones and tablet computers, for example, the Apple iPhone and iPad, that require higher current charging, i.e., up to 2.1 Amps.

SUMMARY OF THE INVENTION

The above and other objects of the invention are achieved by a power outlet/battery charger for a portable electric/electronic device, the power outlet/charger comprising an electrically insulating housing having a proximal end having an opening and a distal end having a first electrical connector; an electronic converter circuit fixedly housed in the housing for receiving a first voltage from a vehicle electrical power source through the first connector and for converting the first voltage to a second voltage compatible with the USB (Universal Serial Bus) standard; and a USB connector disposed through the proximal end opening and connected to receive the second voltage; the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector.

Preferably, the first connector is a US-CAR connector.

Other objects, features and advantages of the present invention will be apparent from the Detailed Description which follows.

BRIEF DESCRIPTION OF THE DRAWINGS

The invention will now be described in greater detail in the following Detailed Description with reference to the drawings in which.

DETAILED DESCRIPTION OF EMBODIMENTS OF THE INVENTION

Figure 1:
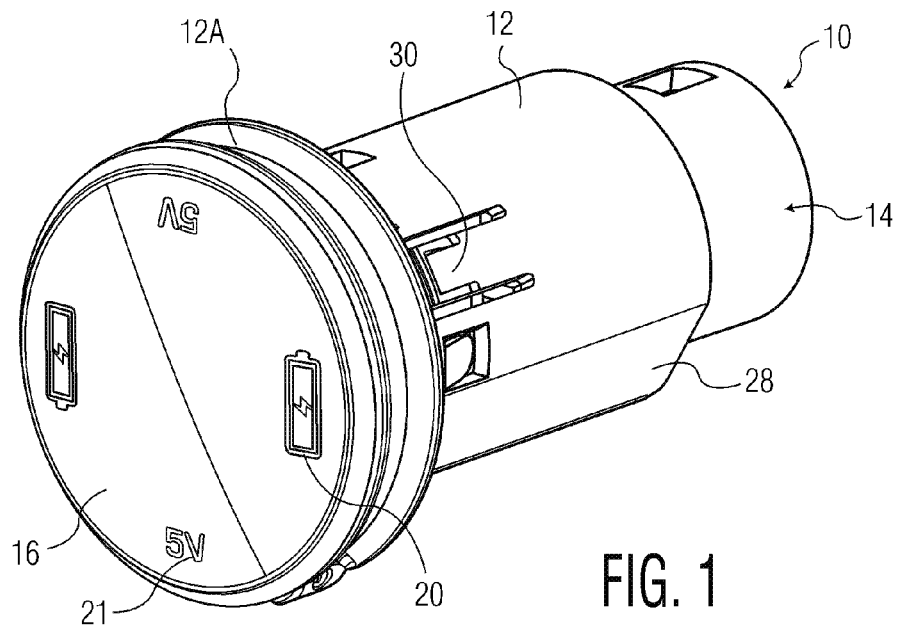
FIG. 1 is a perspective view of the power outlet/charger according to the present invention that can be employed in automotive vehicles.

With reference now to the drawings, FIG. 1 shows a perspective view of the power outlet/charger according to the present invention. The power outlet/charger according to the present invention is a direct replacement for the cigar lighter/power outlet commonly found in vehicles and which has a US-CAR connector for receiving power from the automotive vehicle electrical supply, which is typically 12-14 volts, and, in today's current production vehicles, is connected to the vehicle wiring harness by a plug-in US-CAR connector.

Figure 22:
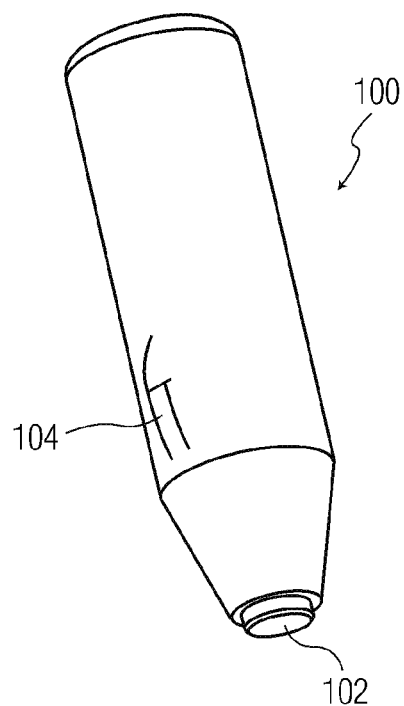
FIG. 22 shows a prior art accessory power plug.
Figure 23:
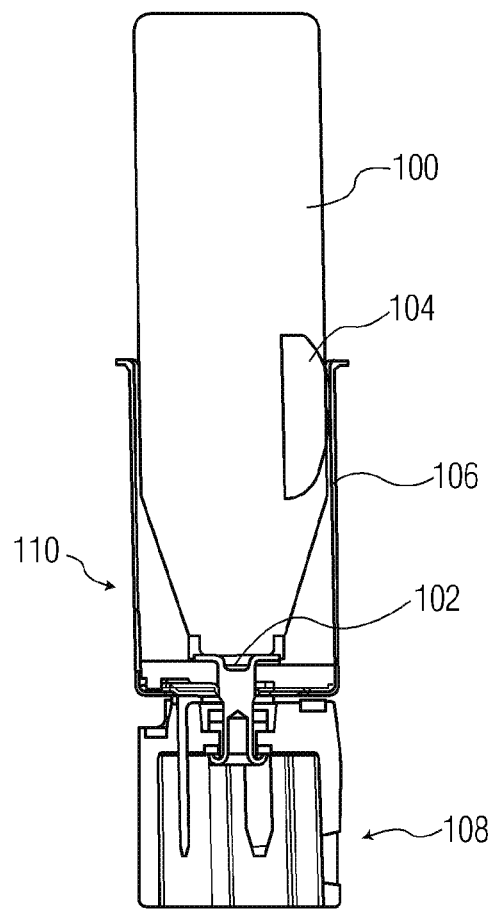
FIG. 23 shows a prior art plug that vehicle power outlet that receives the plug of FIG. 22.

The commonly available power outlet is shown in FIG. 23. The electrical plug that is connected to a portable electrical/electronic device and that plugs into the outlet of FIG. 23 is shown separately in FIG. 22.

Figure 11:
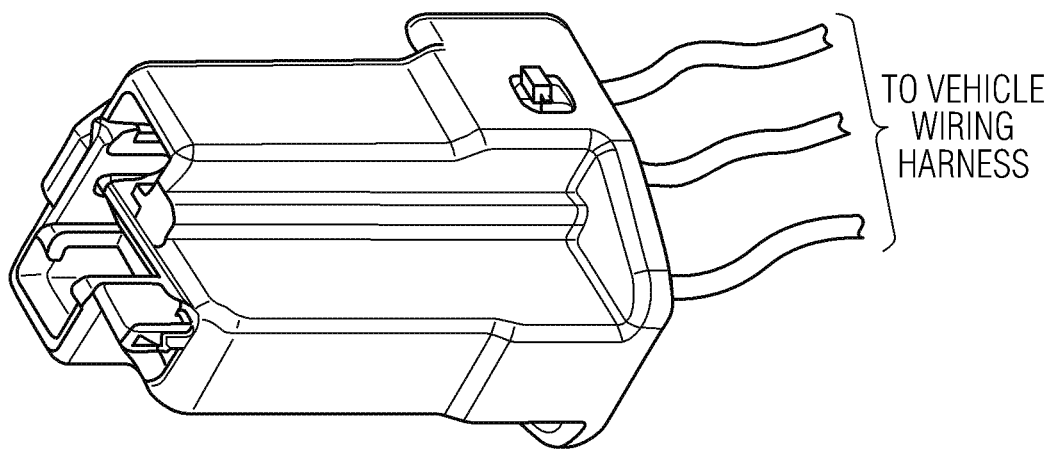
FIG. 11 shows the US-CAR connector that is connected into the wiring harness of the vehicle that is received in the rear opening of the power outlet/charger.
Figure 12:
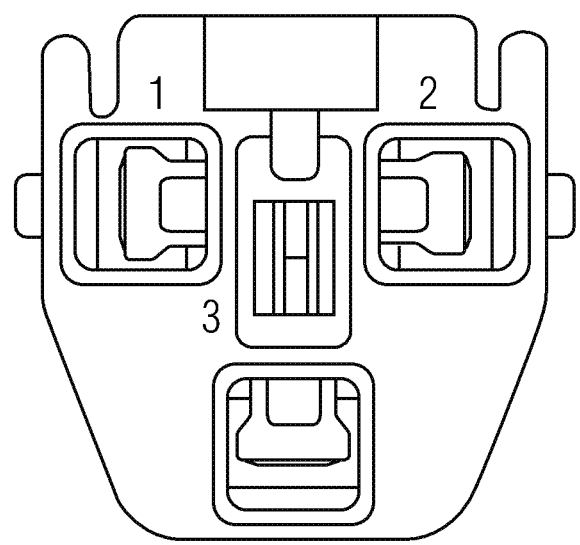
FIG. 12 shows the layout of the terminals of the vehicle wiring harness US-CAR connector.

The US-CAR connector is shown in FIG. 11, and the layout of the electrical terminals is shown in FIG. 12. The US-CAR connector employs three terminals: vehicle positive supply (12-14 volts), vehicle ground and an accessory/illumination connection which is typically a switched vehicle power connection for providing illumination to the socket device so that it can be located in a darkened vehicle interior. It is common to provide an illumination ring which is a light transmissive member that is illuminated by a light source such as an incandescent lamp or an LED located on or about the cigar lighter/power outlet socket.

The present invention thus provides an electrical power outlet/charger that will replace the commonly available cigar lighter/power outlet socket, receives the US-CAR connector from the vehicle harness and converts the 12-14 volt vehicle supply voltage to the 5 volt USB standard and provides a USB style female connector for receiving a male USB connector to connect to a portable device.

Figure 2:
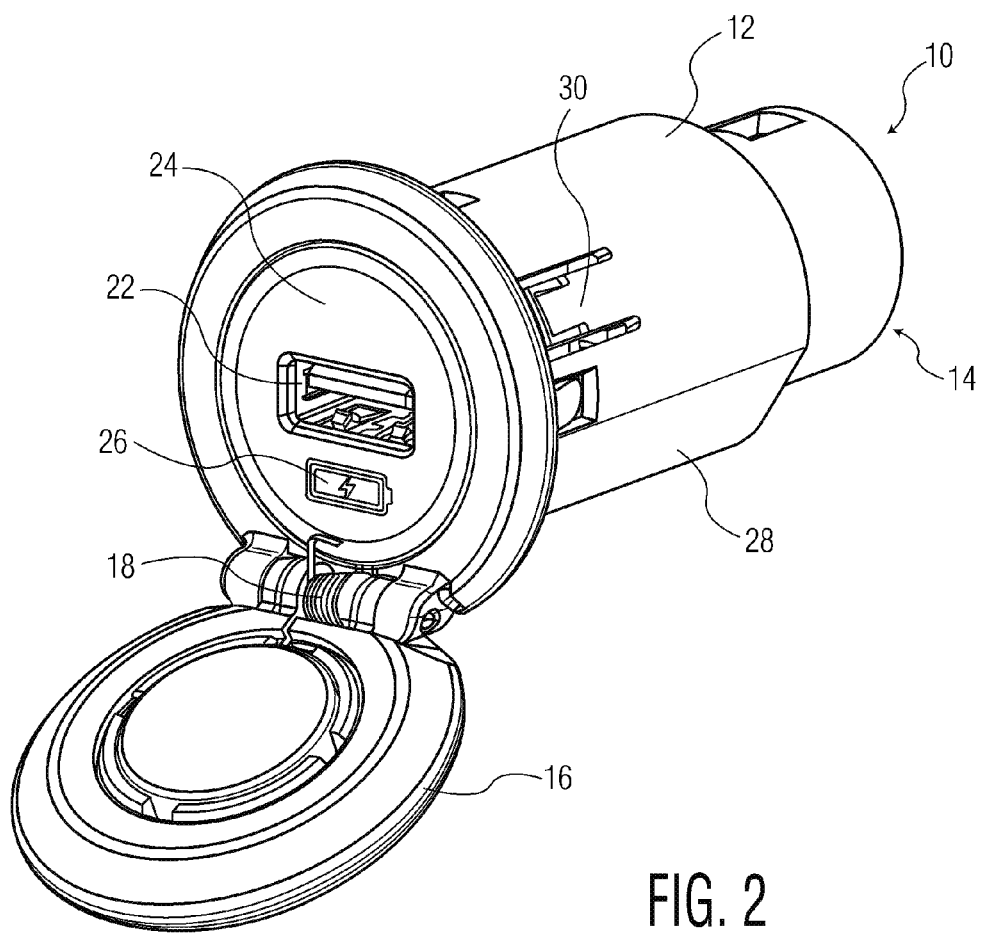
FIG. 2 is a perspective view of the power outlet/charger of FIG. 1 with the cover opened exposing the USB socket.

As shown in FIGS. 1 and 2, the power outlet/charger is generally indicated at 10 and includes a socket housing 12 typically made of an insulating material such as plastic. At a rear or distal end, the socket has a US-CAR connector 14 with the necessary electrical terminals to engage with the mating US-CAR connector of the vehicle wiring harness. At the front or proximal end of the device, a hinged cover 16 is preferably provided, although the cover is not necessary. FIG. 2 shows the cover in its hinged down position. Preferably the hinge includes a torsion spring 18 so that the cover 16 snaps back to the closed position when not used. Instead of a spring hinge, other known cover mechanisms can be employed. Preferably, the cover 16 has a suitable symbol/indication that it is an electrical charging outlet. For example, as shown in FIG. 1, the cover includes a battery charging symbol 20 and an indication 21 that it provides 5 volts.

As shown in FIG. 2, the female USB outlet 22 is contained in the power outlet/charger and is exposed when the cover 16 is moved away from the front surface of the device. Preferably, the surface on which the USB connector 22 is disposed is a light transmissive face plate/light pipe 24 which is illuminated by a light emissive means provided in the charging device, for example, a lamp or LED.

As shown, the faceplate/light pipe 24 preferably also includes a battery charging symbol 26. In a darkened vehicle interior, the member 24 will be illuminated, thus exposing the socket 22 to view and contrasting the battery charging symbol 26.

Preferably, the cover 16 is hinged at the bottom, as shown, but it can be hinged from the top or from the side as desired.

Figure 3:
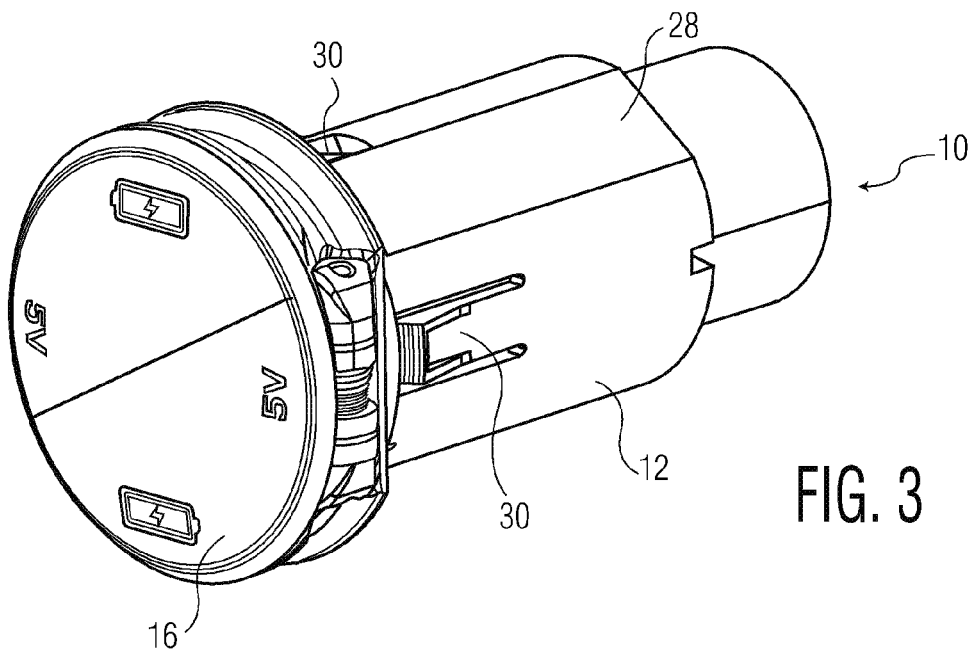
FIG. 3 is a side perspective view of the power outlet/charger of FIG. 1 shown from a different angle.
Figure 6:
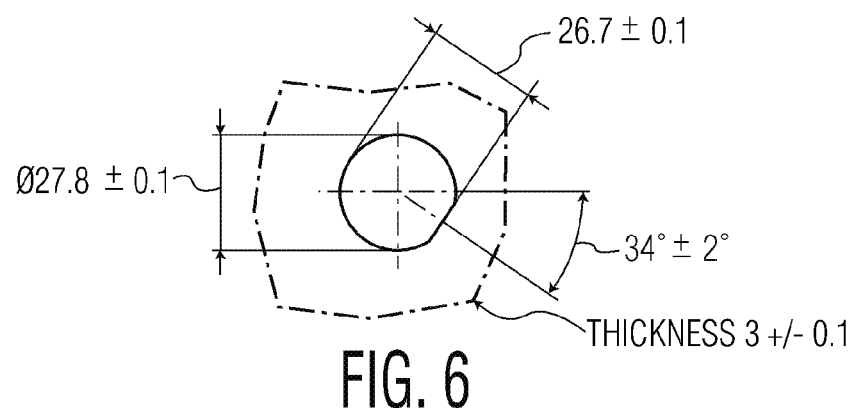
FIG. 6 shows the mounting hole in a vehicle panel for the power outlet/charger.

FIG. 3 is a perspective side view of the power outlet/charger 10 from a different angle. As shown, the housing 12 includes a flat spot 28 to enable the socket to line up in the vehicle panel opening, shown in FIG. 6, which typically employs a flat spot as shown so that the socket will not rotate in the panel and has the desired orientation. FIG. 6 shows the typical panel opening dimensions in mm.

Also shown in FIGS. 1, 2 and 3 are the flexible locking tabs 30, of which several are employed, for example, two or more, around the periphery of the housing 10 to secure the device in the vehicle panel opening when it is inserted in the opening.

Figure 4:
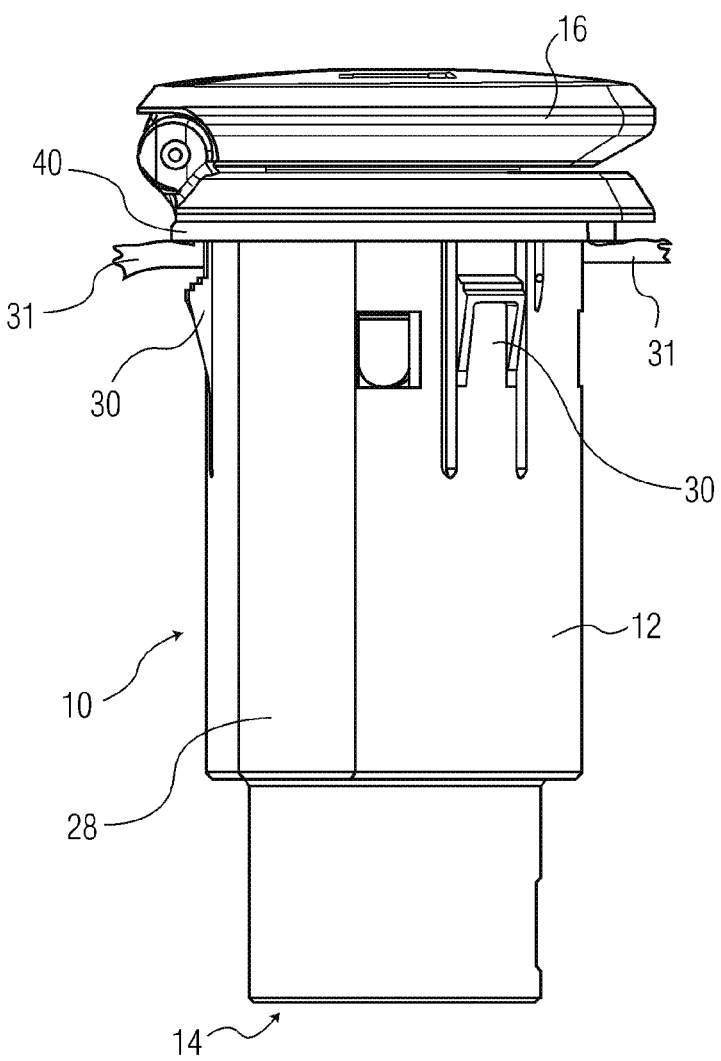
FIG. 4 is a side view of the power outlet/charger.
Figure 4A:
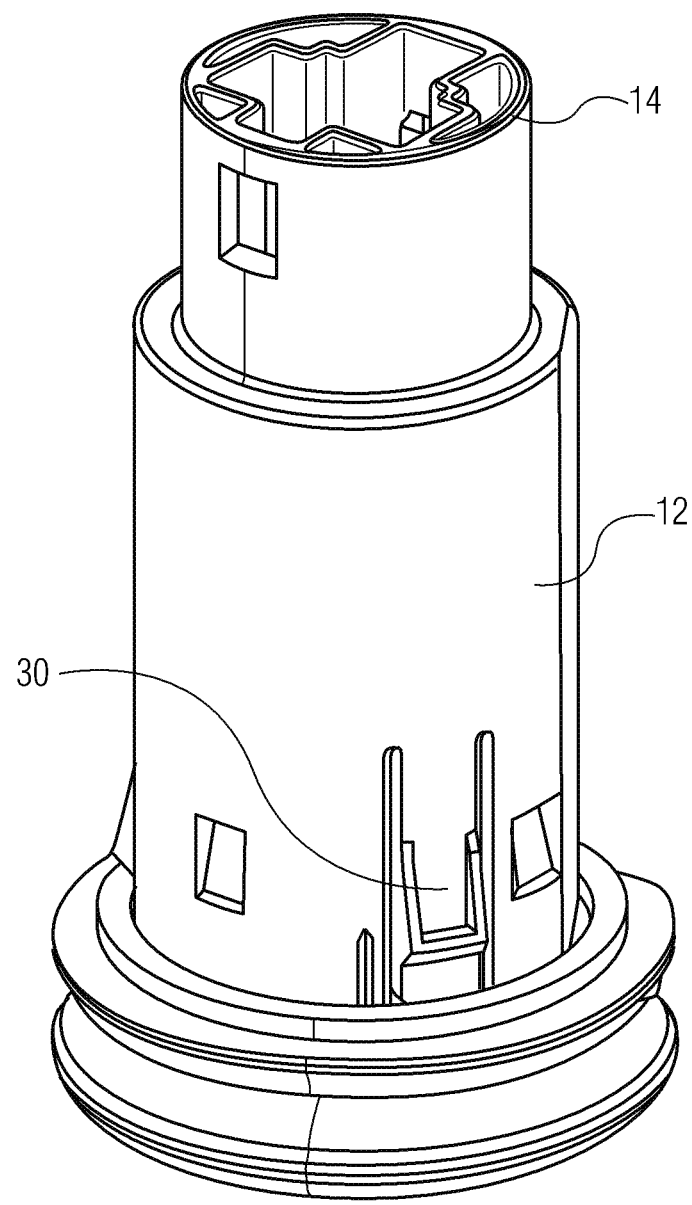
FIG. 4A shows a perspective side/rear view of the socket housing.

FIG. 4 shows a side view of the power outlet/charger showing the locking tabs 30 that flex inwardly when the device is inserted into the panel opening and thereafter snap back into position behind the panel 31.

Figure 5:
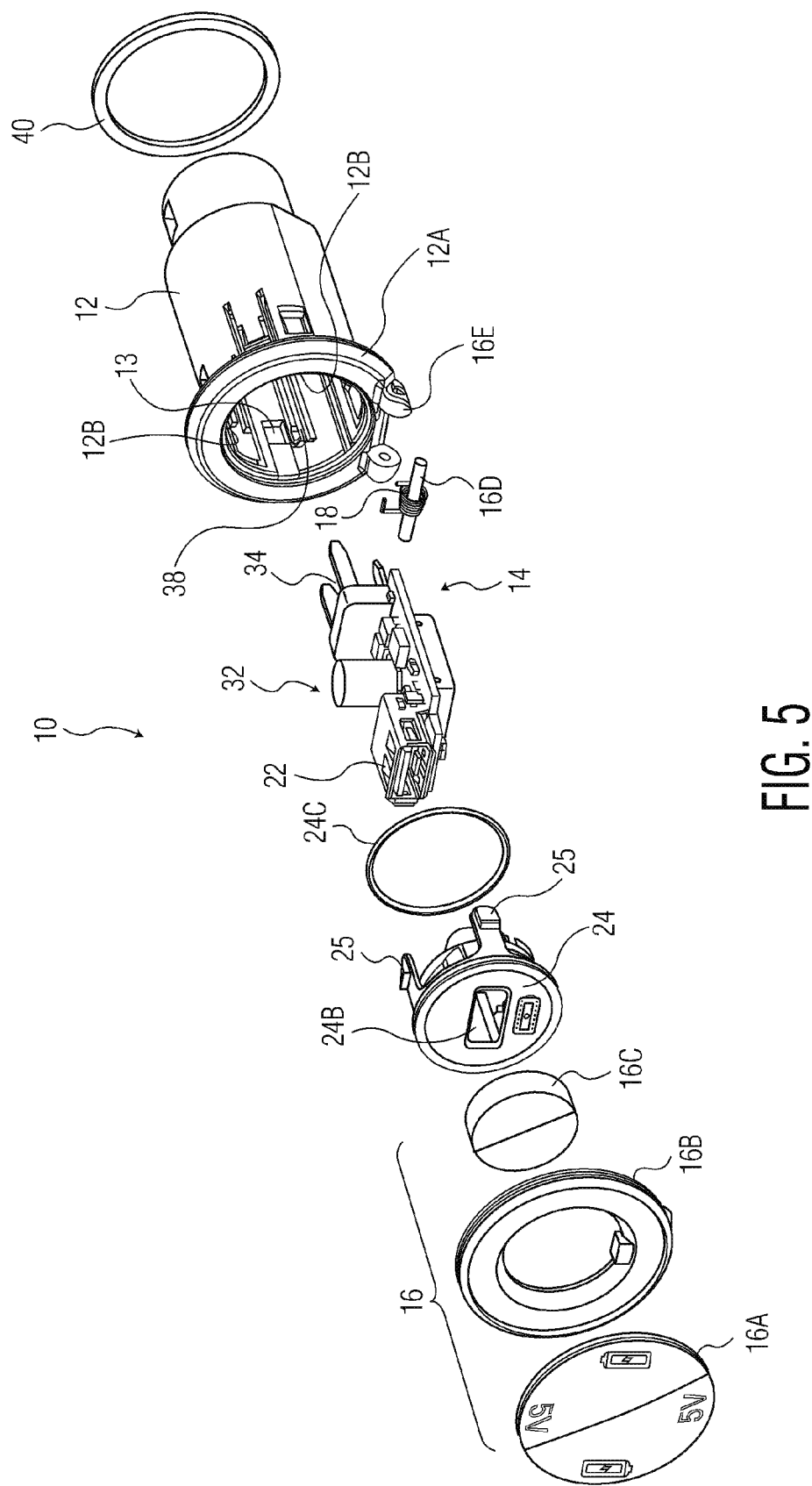
FIG. 5 is an exploded perspective view of the power outlet/charger.

Turning now to FIG. 5, the components of the power outlet/charger are shown in an exploded view. The power outlet/charger includes the housing 12 which receives the printed circuit board (PCB) assembly 32 that includes a DC to DC converter for converting the vehicle electrical supply, at approximately 12-14 volts DC, to the 5 volt DC USB standard and which has at its rear or distal end the US-CAR connector terminals 34 for the US-CAR connector 14, and the USB connector socket 22 mounted on the board at the front or proximal end. The circuit board is received in suitable slots 38 provided in the housing 12 and slides into the housing 12. Details of the electronic converter circuit found on the PCB 32 are not described herein as it is well known in the art. Typically, such converter circuits are switching mode power supplies such as buck converters.

The PCB assembly 32 slides into the opening 12B of housing 12 and the US-CAR connector terminals 34 slide through openings provided at the rear of the housing 12 and thus form the integral US-CAR connector 14. At the front end, after the printed circuit board is disposed in the housing 12, the faceplate/light pipe 24 (made of a light transmissive material) is snapped into the housing 12 and it is secured by suitable flexible locking tabs 25 into openings 13 in the housing 12. An O-ring or other gasket 24C can be provided between member 24 and the opening 12B in the housing 12.

The cover 16 may comprise, for example, three members, including an ornamental cover 16A, an ornamental ring or bezel 16B which may comprise, for example, a chrome ring and a rubber/foam seal/water ingress seal 16C. The cover 16, as described previously, is mounted on a pivot shaft 16D and is biased into closed position by a torsion spring 18.

The power outlet/charger 10 may be provided with a suitable panel gasket 40 which is slid onto the housing 12 and provides a gasket between the shoulder 12A of the housing 12 and the vehicle panel 31.

Figure 7:
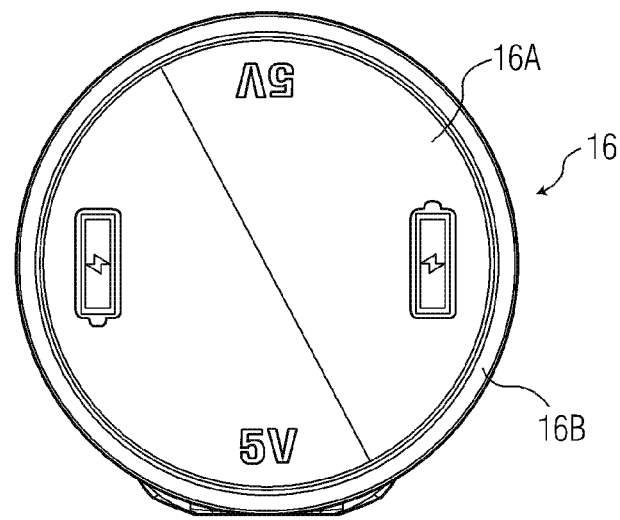
FIG. 7 is a front view of the power outlet/charger showing the cover in its closed position.
Figure 8:
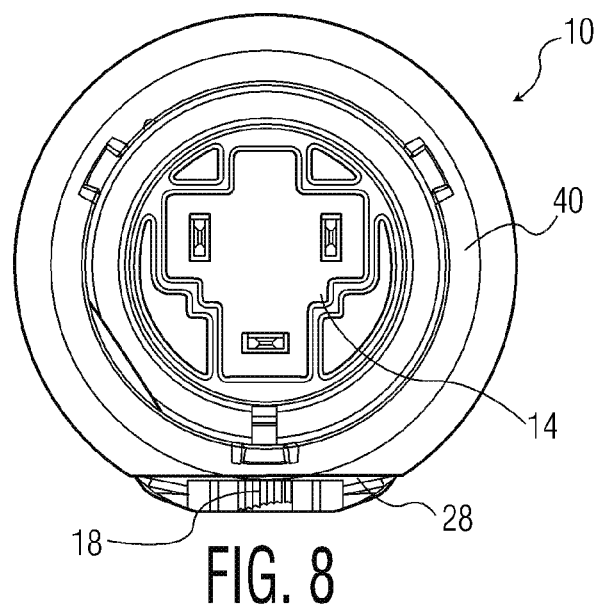
FIG. 8 shows a rear view of the power outlet/charger showing the US-CAR connector
Figure 8A:
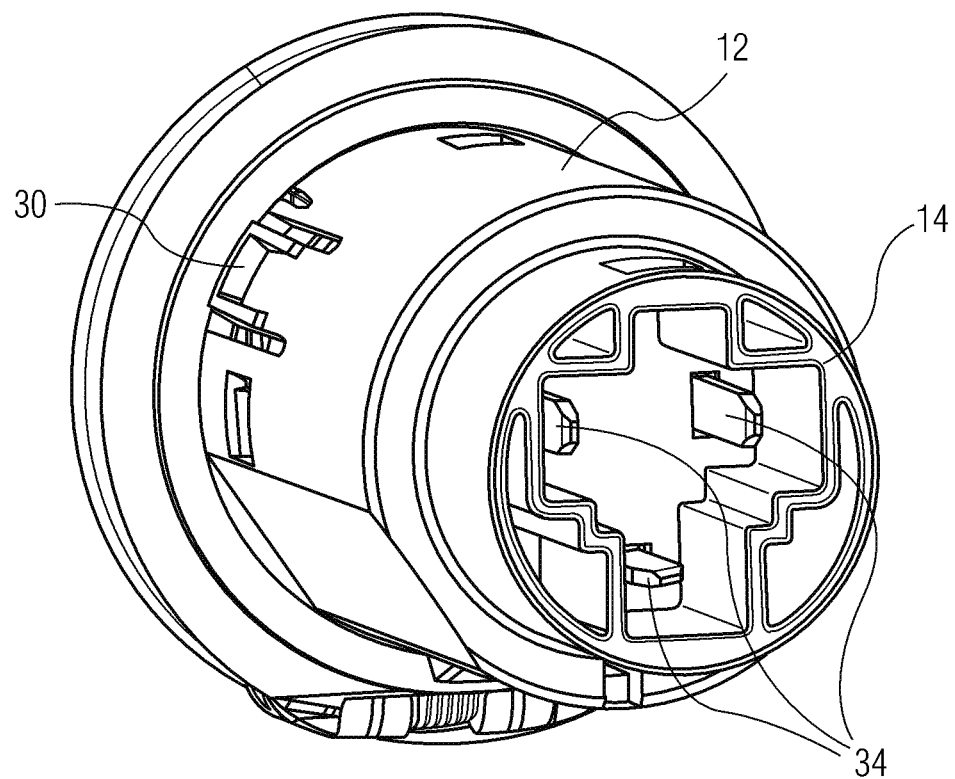
FIG. 8A shows the power outlet/charger in a rear perspective view.
Figure 9:
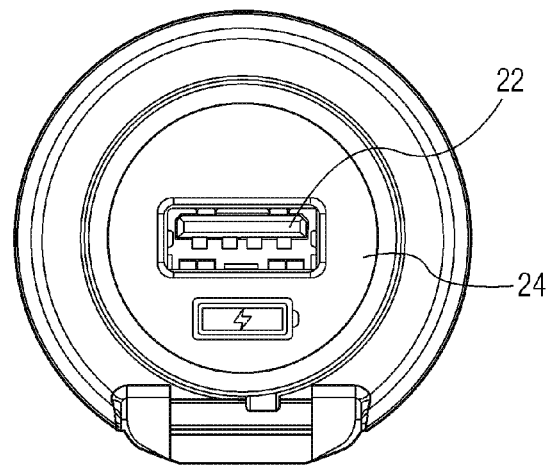
FIG. 9 is a front view of the power outlet/charger with the cover removed.
Figure 10:
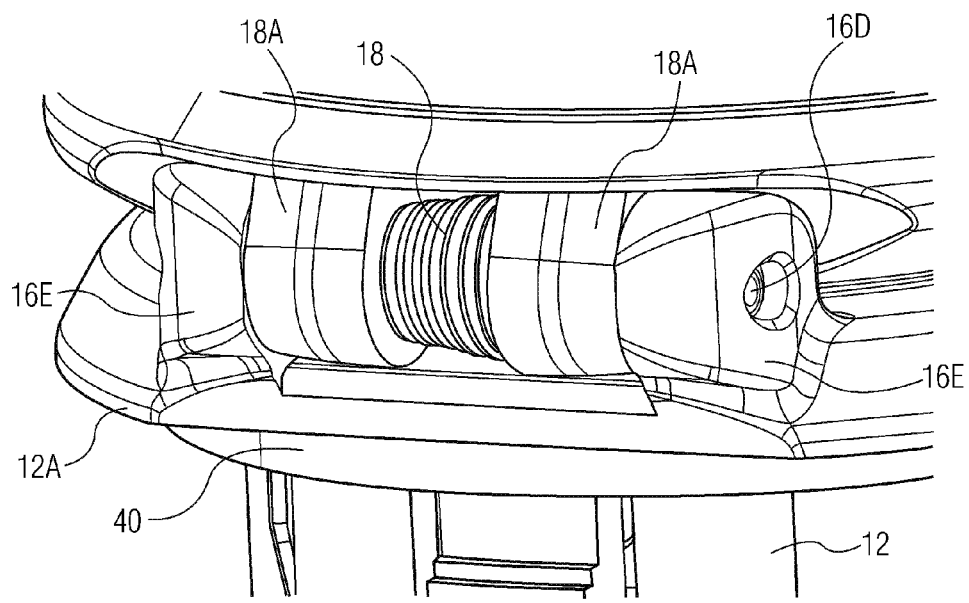
FIG. 10 shows details of the spring loaded hinge mechanism for the cover.

FIG. 7 shows a front view of the power outlet/charger as it would appear when mounting in the vehicle panel. FIG. 8 shows the rear of the power outlet/charger showing the US-CAR connector 14 and, in particular, showing the three electrical terminals of the US-CAR connector. Also clearly visible is the flat spot 28 which serves to orient the device in the opening and prevent rotation. FIG. 9 shows the cover 16 removed, exposing the USB socket 22 and faceplate/light pipe 24. FIG. 10 shows details of the spring loaded hinge design, showing the molded in pivot bosses 16E for the pivot pin 16D as well as the pivot bosses 18A molded to the cover bezel 16B.

Figure 13:
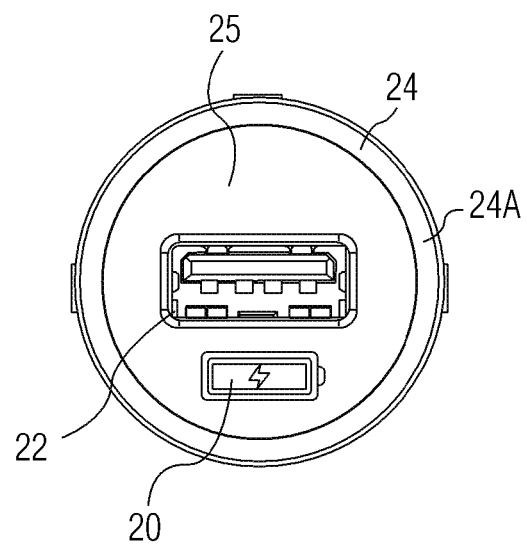
FIG. 13 shows the faceplate/light pipe of the power outlet/charger with the USB connector.
Figure 14:
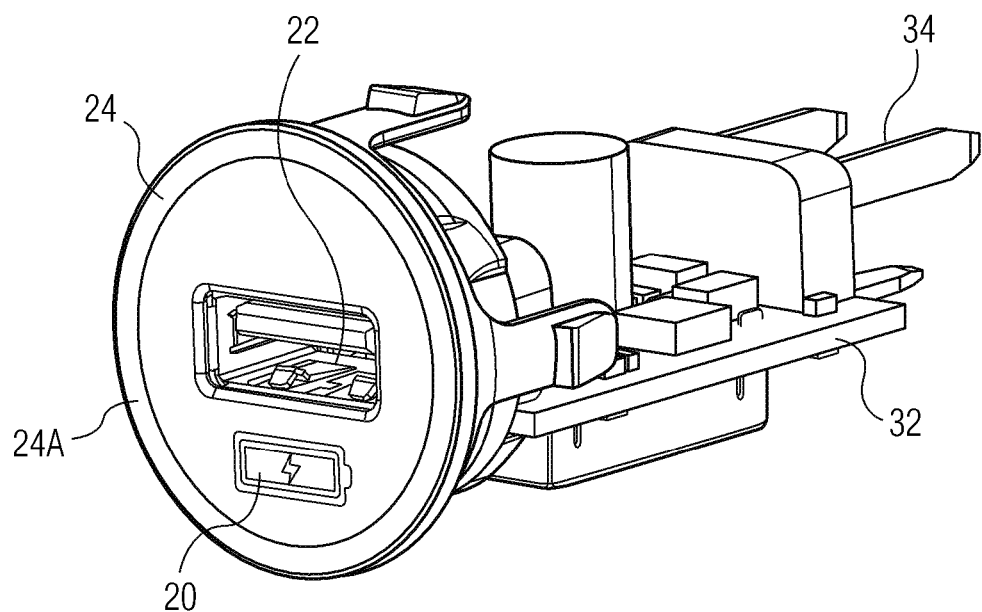
FIG. 14 shows the converter circuit board with the faceplate/light pipe attached.

FIGS. 13 and 14 show a front view of a modified form of the faceplate/light pipe 24 with the USB connector 22. In this embodiment, the faceplate/light pipe 24 has been provided with a dark coloration or paint at 25 so that the light illumination only appears around the perimeter of the light pipe/faceplate at 24A and through the battery charging symbol 20. Preferably, the faceplate/light pipe 24 is painted black with a laser etching for the ring 24A and battery symbol 20 so that they can be illuminated by the light source.

Figure 15:
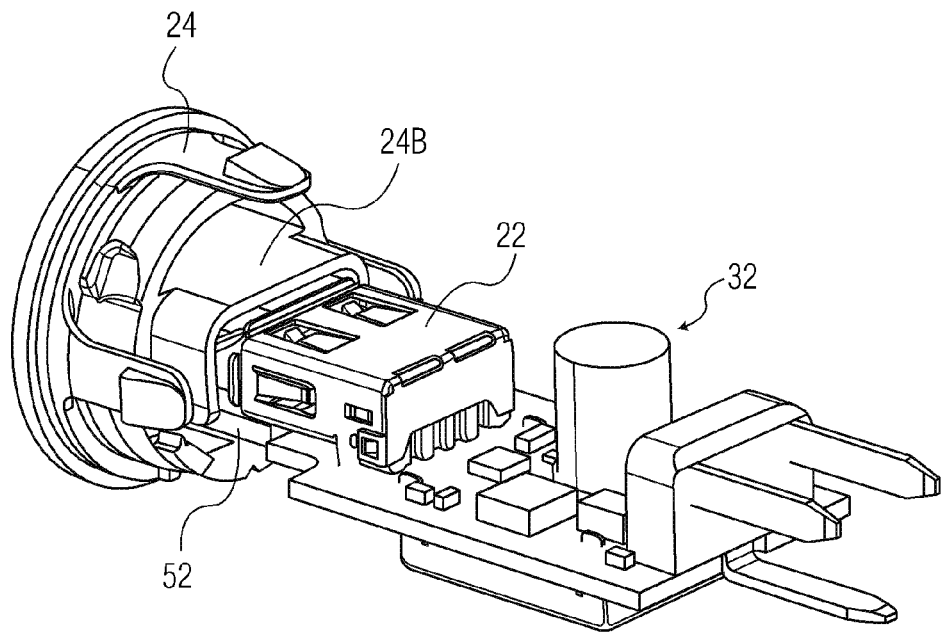
FIG. 15 shows a rear, exploded perspective view of the converter circuit board and the faceplate/light pipe.
Figure 16:
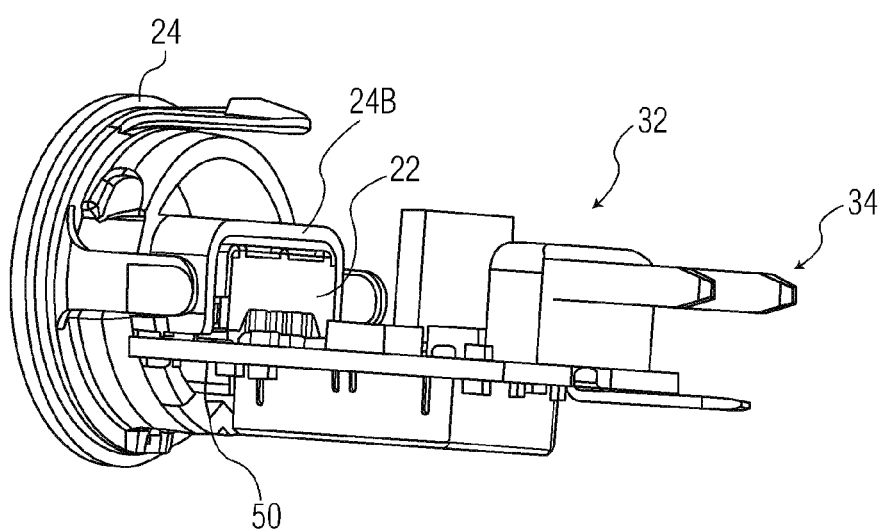
FIG. 16 shows the converter circuit board assembled to the faceplate/light pipe in a rear perspective view.

FIGS. 15 and 16 show perspective rear/side views of the circuit board 32 and faceplate/light pipe 24 assembly. FIG. 15 shows the printed circuit board 32 before the faceplate/light pipe 24 is assembled to the printed circuit board 32. FIG. 16 shows how the circuit board 32 is received in the faceplate/light pipe 24. The faceplate/light pipe includes an integral housing 24B with an opening to receive the USB connector 22. Preferably the housing 24B forms a small enclosure that prevents light from escaping through the USB socket and thereby only allows light to illuminate the ring 24A and battery symbol 20. The light source preferably comprises an LED 50 that is shown in FIG. 16 mounted on the underside of the printed circuit board assembly 32. As shown in FIG. 15, light from the LED 50 is received on the surfaces 52 of the faceplate/light pipe and those light rays are projected toward the ring 24A and battery symbol 20 on the front of the faceplate/light pipe 24.

Figure 17:
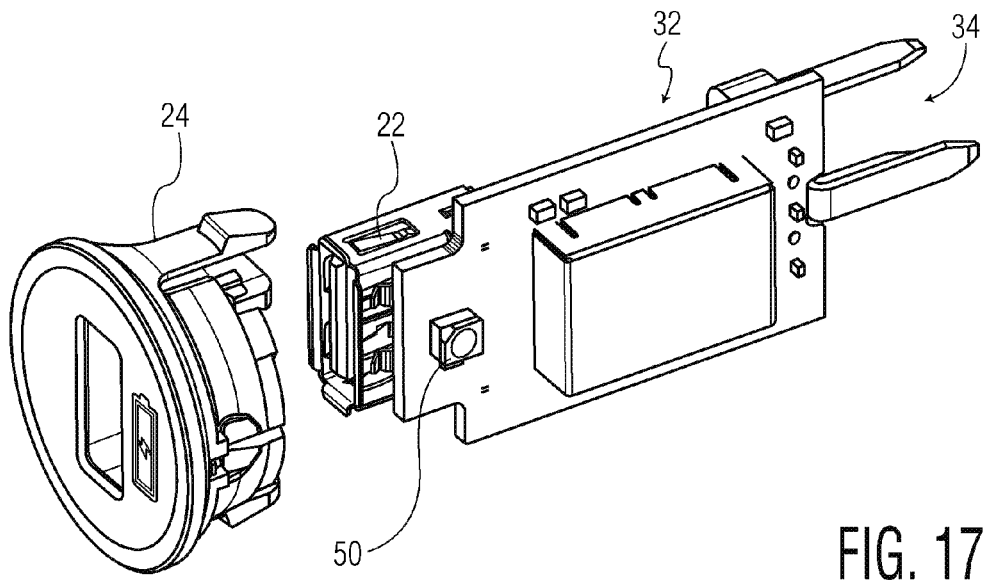
FIG. 17 shows another view of the faceplate/light pipe and converter circuit board in an exploded view.

FIG. 17 shows a different view of the assembly of the faceplate/light pipe 24 to the printed circuit board assembly 32 and showing, in particular, the location of the LED light source 50.

Figure 18:
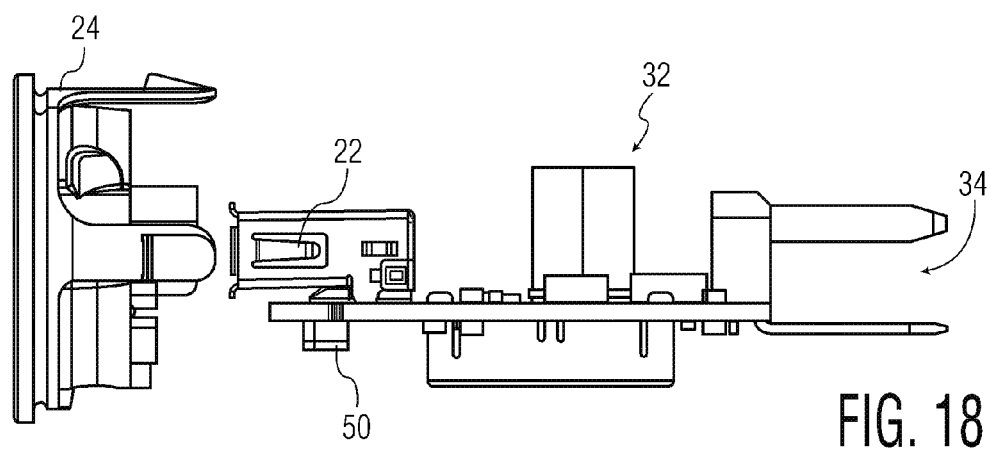
FIG. 18 shows a side exploded view of the faceplate/light pipe and converter circuit board.
Figure 19:
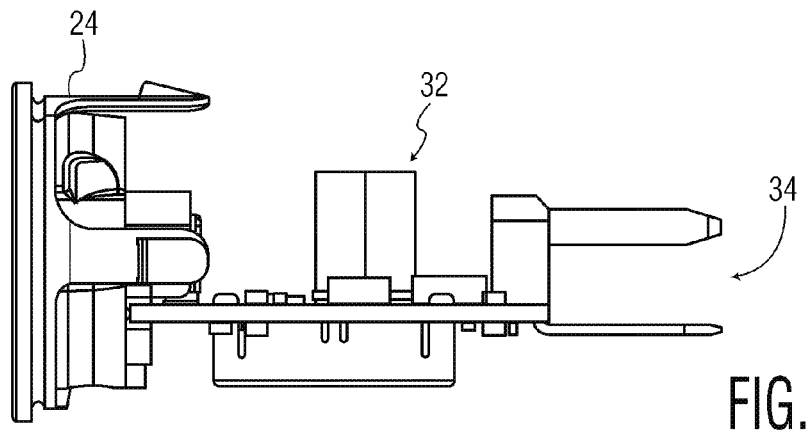
FIG. 19 shows a side view of the faceplate/light pipe and converter circuit board in assembled condition.

FIG. 18 presents a side exploded view of the printed circuit board 32 and the faceplate/light pipe 24. FIG. 19 shows the assembly of the printed circuit board 32 and the faceplate/light pipe 24 showing that the USB connector 22 and the LED 50 are received in the housing 24B opening in the faceplate/light pipe 24.

Figure 20:
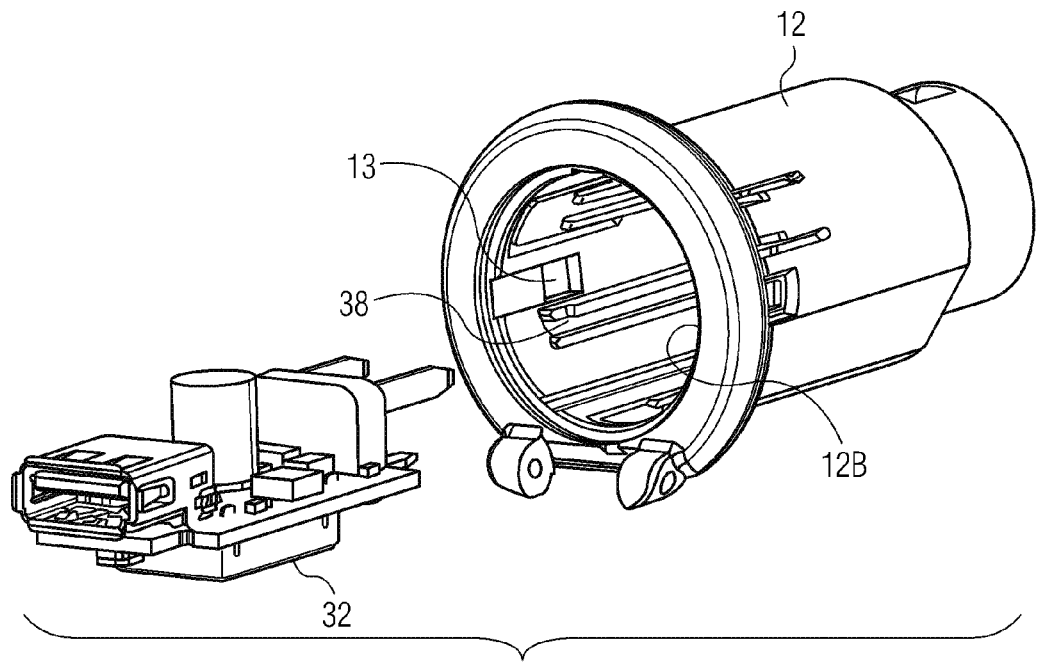
FIG. 20 shows the socket housing prior to insertion of the converter circuit board.
Figure 21:
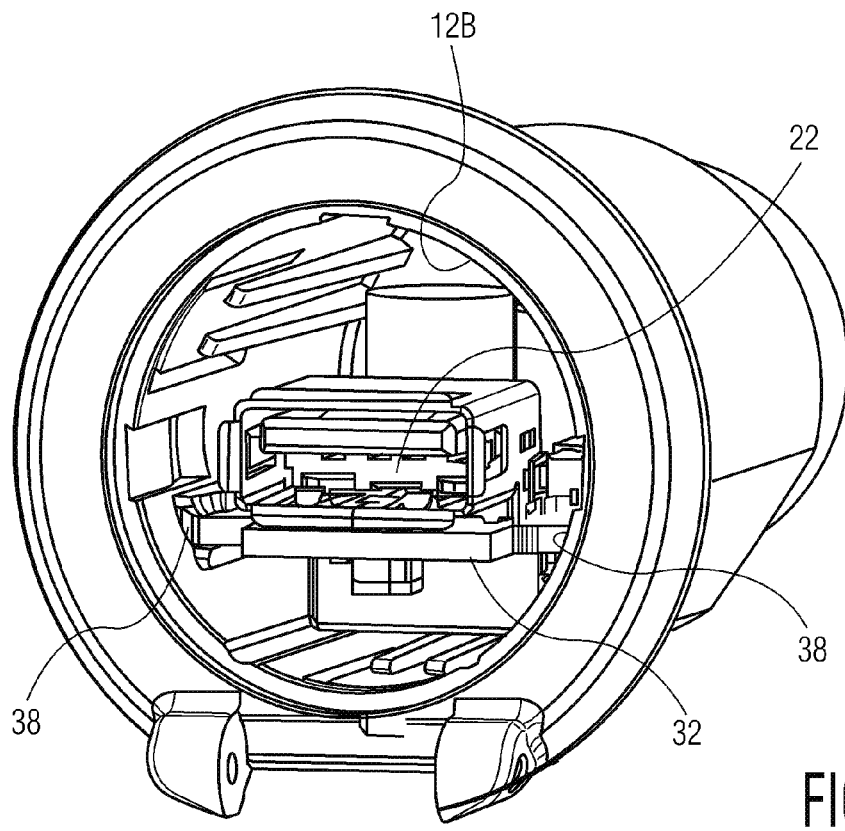
FIG. 21 shows a front view of the housing with the converter circuit board mounted therein prior to snapping in the faceplate/light pipe, the faceplate/light pipe being shown snapped into position in FIG. 9.

FIG. 20 illustrates the method of assembly of the circuit board 32 into the housing 12. The housing 12 includes slots or channels 38 at opposed sides thereof into which the circuit board 32 is slidably assembled as shown in FIG. 21. Then, as shown in FIG. 5, the faceplate/light pipe is positioned in the opening of the housing 12 and snapped into it, the locking tabs 25 (see FIG. 5) being received in the openings 13 in the housing 12, thereby securely locking the faceplate/light pipe 24 to the housing 12 with the USB connector 22 exposed through the housing 24B opening in the faceplate/light pipe 24.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A power outlet/charger for a portable electric/electronic device, the power outlet/charger comprising:
   an electrically insulating housing having a proximal end having an opening and a distal end having a first electrical connector;
   an electronic converter circuit fixedly housed in the housing for receiving a first voltage from a vehicle electrical power source through the first connector and for converting the first voltage to a second voltage compatible with the USB (Universal Serial Bus) standard; and
   a USB connector disposed through the proximal end opening and connected to receive the second voltage;
   the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector,
   the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;
   the USB connector and electronic converter circuit being nonremovably disposed in said housing.

2. The power outlet/charger of claim 1, wherein the first electrical connector is a US-CAR connector.

3. The power outlet/charger of claim 2, further comprising a front cover disposed at the proximal end of the housing for covering the USB connector when not in use.

4. The power outlet/charger of claim 3, wherein the cover is hingedly attached to the housing.

5. The power outlet/charger of claim 4, wherein the cover is biased by a spring to close the cover when not in use.

6. The power outlet/charger of claim 2, further comprising an illumination source disposed in the housing for illuminating the proximal end of the housing.

7. The power outlet/charger of claim 1, wherein the electronic converter circuit comprises a switching mode power supply for converting approximately 12-14 volts DC to approximately 5 volts DC.

8. The power outlet/charger of claim 2, wherein the electronic converter circuit has a current capacity of approximately 2.1 A at 5 V DC.

9. A power outlet/charger for a portable electric/electronic device, the power outlet/charger comprising:
   an electrically insulating housing having a proximal end having an opening and a distal end having a first electrical connector;
   an electronic converter circuit fixedly housed in the housing for receiving a first voltage from a vehicle electrical power source through the first connector and for converting the first voltage to a second voltage compatible with the USB (Universal Serial Bus) standard; and
   a USB connector disposed through the proximal end opening and connected to receive the second voltage;
   the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector,
   the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;
   the USB connector and electronic converter circuit being nonremovably disposed in said housing;
   wherein the first electrical connector is a US-CAR connector;
   further comprising an illumination source disposed in the housing for illuminating the proximal end of the housing;
   further comprising a light pipe at the proximal end of the housing forming a faceplate surrounding the USB connector and illuminating the proximal end of the housing in the area of the USB connector.

10. The power outlet/charger of claim 9, wherein the light pipe comprises an illumination ring.

11. The power outlet/charger of claim 10, further comprising an illuminated battery charging symbol disposed on the light pipe.

12. The power outlet/charger of claim 9, wherein the electronic converter circuit comprises a printed circuit board assembly.

13. The power outlet/charger of claim 12, wherein the illumination source is mounted on said printed circuit board assembly.

14. The power outlet/charger of claim 13, wherein the illumination source comprises an LED.

15. The power outlet/charger of claim 13, wherein the faceplate comprises a housing for receiving the USB connector that prevents light from the illumination source from emanating from the USB connector.

16. A power outlet/charger for a portable electric/electronic device, the power outlet/charger comprising:
   an electrically insulating housing having a proximal end having an opening and a distal end having a first electrical connector;
   an electronic converter circuit fixedly housed in the housing for receiving a first voltage from a vehicle electrical power source through the first connector and for converting the first voltage to a second voltage compatible with the USB (Universal Serial Bus) standard; and
   a USB connector disposed through the proximal end opening and connected to receive the second voltage;
   the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector,
   the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;
   the USB connector and electronic converter circuit being nonremovably disposed in said housing;
   wherein the first electrical connector is a US-CAR connector;
   further comprising a front cover disposed at the proximal end of the housing for covering the USB connector when not in use;
   wherein the cover comprises an ornamental surface and a ring receiving and surrounding the ornamental surface, the ring having a portion of a hinge for the cover formed therewith.

17. A power outlet/charger for a portable electric/electronic device, the power outlet/charger comprising:
   an electrically insulating housing having a proximal end having an opening and a distal end having a first electrical connector;
   an electronic converter circuit fixedly housed in the housing for receiving a first voltage from a vehicle electrical power source through the first connector and for converting the first voltage to a second voltage compatible with the USB (Universal Serial Bus) standard; and
   a USB connector disposed through the proximal end opening and connected to receive the second voltage;
   the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector,
   the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;
   the USB connector and electronic converter circuit being nonremovably disposed in said housing;
   wherein the first electrical connector is a US-CAR connector;
   further comprising an illumination source disposed in the housing for illuminating the proximal end of the housing;
   further comprising a light pipe at the proximal end of the housing forming a faceplate surrounding the USB connector and illuminating the proximal end of the housing in the area of the USB connector;

wherein the electronic converter circuit comprises a printed circuit board assembly;

wherein the printed circuit board assembly slides in channels in the housing and is retained in position by said faceplate.

18. The power outlet/charger of claim 17, wherein the faceplate snaps into the housing at the proximal end and has an opening through which the USB connector is disposed, the faceplate fixedly securing the printed circuit board assembly in the housing.

19. A power outlet/charger for a portable electric/electronic device, the power outlet/charger comprising:

an electrically insulating housing having a proximal end having an opening and a distal end having a first electrical connector;

an electronic converter circuit fixedly housed in the housing for receiving a first voltage from a vehicle electrical power source through the first connector and for converting the first voltage to a second voltage compatible with the USB (Universal Serial Bus) standard; and a USB connector disposed through the proximal end opening and connected to receive the second voltage;

the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector, the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;

the USB connector and electronic converter circuit being nonremovably disposed in said housing;

wherein the first electrical connector is a US-CAR connector;

further comprising an illumination source disposed in the housing for illuminating the proximal end of the housing;

further comprising a light pipe at the proximal end of the housing forming a faceplate surrounding the USB connector and illuminating the proximal end of the housing in the area of the USB connector;

wherein the electronic converter circuit comprises a printed circuit board assembly;

wherein the printed circuit board assembly comprises electrical terminals for the US-CAR connector at a distal end of the printed circuit board assembly, the electrical terminals received in corresponding openings in the distal end of the housing.

20. The power outlet/charger of claim 19, wherein the printed circuit board assembly has the USB connector mounted thereon.

21. A power outlet/charger for a portable electric/electronic device, the power outlet/charger comprising:

an electrically insulating housing having a proximal end having an opening and a distal end having a first electrical connector;

an electronic converter circuit fixedly housed in the housing for receiving a first voltage from a vehicle electrical power source through the first connector and for converting the first voltage to a second voltage compatible with the USB (Universal Serial Bus) standard; and a USB connector disposed through the proximal end opening and connected to receive the second voltage;

the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector, the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;

the USB connector and electronic converter circuit being nonremovably disposed in said housing;

further comprising a keying portion on the housing for orienting the housing in the vehicle opening.

22. The power outlet/charger of claim 21, wherein the keying portion prevents rotation of the housing in the panel opening.

23. The power outlet/charger of claim 22, wherein the keying portion comprises a flat spot on the housing.

24. A power outlet/charger for a portable electric/electronic device, the power outlet/charger comprising:

an electrically insulating housing having a proximal end having a faceplate and a distal end having a first electrical connector;

an electronic converter circuit fixedly housed in the housing for receiving a first voltage from a vehicle electrical power source through the first connector and for converting the first voltage to a second voltage compatible with the USB (Universal Serial Bus) standard; and a USB connector disposed through an opening in the faceplate at the proximal end and connected to receive the second voltage;

the housing being sized to directly replace a standard vehicle electrical cigar lighter socket/power outlet and fit into an opening in a vehicle panel for the standard vehicle electrical cigar lighter socket/power outlet, the first electrical connector being connectable to an electrical wiring harness of the vehicle having a connector that releasably connects with the first connector, the housing being directly received in the opening in the vehicle panel, wherein the housing has a shoulder for abutting against the panel of the vehicle when the housing is inserted into the opening in the vehicle panel and further wherein the housing has a plurality of locking tabs for locking the housing to the panel;

the USB connector and electronic converter circuit being nonremovably disposed in said housing;

wherein the electronic converter circuit comprises a printed circuit board assembly;

the USB connector being mounted on the printed circuit board assembly; and wherein the printed circuit board assembly slides in channels in an interior of the housing and is retained in position by said faceplate at the proximal end.

* * * * *